(12) United States Patent
Mizuno et al.

(10) Patent No.: US 9,368,847 B2
(45) Date of Patent: Jun. 14, 2016

(54) RECHARGEABLE METAL NITRIC OXIDE GAS BATTERY

(71) Applicant: Toyota Motor Engineering & Manufacturing North America, Inc., Erlanger, KY (US)

(72) Inventors: Fuminori Mizuno, Ann Arbor, MI (US); Paul T. Fanson, Brighton, MI (US); Charles A. Roberts, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 166 days.

(21) Appl. No.: 14/222,989

(22) Filed: Mar. 24, 2014

(65) Prior Publication Data

US 2015/0194717 A1    Jul. 9, 2015

Related U.S. Application Data

(63) Continuation-in-part of application No. 14/150,168, filed on Jan. 8, 2014.

(51) Int. Cl.
*H01M 8/22*    (2006.01)
*H01M 2/10*    (2006.01)
(Continued)

(52) U.S. Cl.
CPC ............ *H01M 12/08* (2013.01); *F01N 3/0807* (2013.01); *F01N 3/0842* (2013.01); *H01M 8/0606* (2013.01); *H01M 8/22* (2013.01)

(58) Field of Classification Search
USPC .............................. 429/218.1, 100, 104, 105
IPC ............. H01M 8/222,4/13, 4/58, 8/184, 10/625
See application file for complete search history.

(56) References Cited

U.S. PATENT DOCUMENTS 3,804,739 A     4/1974   Bergeron
3,979,225 A     9/1976   Smith et al.
(Continued)

FOREIGN PATENT DOCUMENTS

CN    102208653    10/2011
CN    102371888    3/2012
(Continued)

OTHER PUBLICATIONS

International Search Report and Written Opinion issued Jun. 10, 2015 in PCT/IB 14/02809 filed on Sep. 29, 2014.
(Continued)

*Primary Examiner* — Patrick Ryan
*Assistant Examiner* — Julian Anthony
(74) *Attorney, Agent, or Firm* — Oblon, McClelland, Maier & Neustadt, L.L.P.

(57) ABSTRACT

A metal-$N_xO_y$ electrochemical cell is provided. The cell contains a partition which inhibits diffusion of $N_xO_y^+$ active species from the cathode compartment to the anode compartment. Also provided is a rechargeable battery containing the metal-$N_xO_y$ electrochemical cell. A vehicle system wherein $N_xO_y$ from a combustion engine exhaust is fed to a metal-$N_xO_y$ battery is additionally provided.

25 Claims, 3 Drawing Sheets

(51) Int. Cl.
  *H01M 4/36* (2006.01)
  *H01M 4/48* (2010.01)
  *H01M 4/13* (2010.01)
  *H01M 4/58* (2010.01)
  *H01M 12/08* (2006.01)
  *H01M 8/06* (2016.01)
  *F01N 3/08* (2006.01)

(56) References Cited

U.S. PATENT DOCUMENTS

| | | | |
|---|---|---|---|
| 4,321,313 A | 3/1982 | Langer et al. | |
| 4,390,602 A * | 6/1983 | Struthers | H01M 2/26 429/101 |
| 5,084,144 A | 1/1992 | Reddy et al. | |
| 5,447,610 A | 9/1995 | Sharifian | |
| 5,489,421 A | 2/1996 | Velzen | |
| 5,976,721 A | 11/1999 | Limaye | |
| 7,740,982 B2 | 6/2010 | Yoshizawa et al. | |
| 8,182,943 B2 * | 5/2012 | Visco | H01M 12/04 429/104 |
| 2002/0160251 A1 | 10/2002 | Chang et al. | |
| 2009/0004072 A1 | 1/2009 | Hamamoto et al. | |
| 2009/0084085 A1 | 4/2009 | Kawai | |
| 2010/0247981 A1 | 9/2010 | Huang | |
| 2012/0094193 A1 | 4/2012 | Albertus et al. | |
| 2012/0141889 A1 | 6/2012 | Lee et al. | |
| 2013/0089810 A1 | 4/2013 | Hiraiwa et al. | |
| 2013/0216924 A1 | 8/2013 | Hillhouse | |
| 2013/0266888 A1 * | 10/2013 | Chen | H01M 8/1004 429/482 |

FOREIGN PATENT DOCUMENTS

| | | |
|---|---|---|
| JP | 2011-070835 | 4/2011 |
| KR | 20090026589 | 3/2009 |

OTHER PUBLICATIONS

U.S. Appl. No. 14/221,814, filed Mar. 21, 2014, Mizuno, et al.

* cited by examiner

11: Combustion engine
12: NO gas absorber
13: Metal-gas battery
14: Vacuum pump
15: Catalytic reactor

RECHARGEABLE METAL NITRIC OXIDE GAS BATTERY

CROSS REFERENCE TO RELATED APPLICATIONS

This application is a continuation in part of prior U.S. application Ser. No. 14/150,168, filed Jan. 8, 2014, the disclosure of which is incorporated herein by reference in its entirety.

BACKGROUND OF THE INVENTION

The present invention is directed to a metal-gas battery with a cathode comprising nitrogen oxides as an active material wherein the cathode active material may be supplied in the form of an exhaust stream from a combustion process.

In prior U.S. application Ser. No. 14/150,168, a metal-nitric oxide battery was described. The metal-nitric oxide battery is of great interest due to properties such as 1) a high redox potential at 1.0 V. vs. $Ag/Ag^+$; 2) high reversibility; and 3) negligible influence of the supporting electrolyte salt on the NO redox reaction in comparison to a metal-$O_2$ gas battery.

A charge-discharge profile of a Li/NO gas battery was generated by using a model cell. The model battery worked well to verify the concept of this type of battery. However, the model battery employed to demonstrate the concept design displayed very low coulombic efficiency of the charge-discharge capacity, which was observed to be around 33%. Without being constrained by theory, the inventors believe that the reason for low efficiency may be the simultaneous reduction of the charged species ($NO^+$) at a counter electrode (anode).

Under theoretical conditions, NO is oxidized on a working electrode (cathode) during charging to form a NO ion. Then, the charged species is reduced on the working electrode during discharging to return NO. However, in the model cell previously described, NO as the charged state may easily diffuse in the electrolyte media to the anode where it would be reduced back to NO even during charging. As a result of this migration and reduction, the concentration of charged species near the working electrode just after charging is significantly depleted and therefore, upon discharge the concentration of the NO is quite low in comparison to the charge capacity, and thus the coulombic efficiency is also very low.

Therefore, there is a need to improve the discharge capacity of the metal-NO cell if the system is to be commercially viable.

SUMMARY OF THE INVENTION

To address the discharge capacity problem, the inventors have studied the insertion of a partition between anode and cathode to physically separate the electrodes and hinder or ultimately prevent diffusion of the NO to the anode, thus maintaining the concentration of the charged species only near the cathode.

This and other objects are addressed by the present invention, the first embodiment of which includes an electrochemical cell comprising: an anode compartment comprising a working electrode which comprises a metal; a cathode compartment comprising a porous cathode supplied with a gas comprising at least one of nitric oxide (NO) and a redox active $N_xO_y$ gaseous compound; a partition located between and separating the anode compartment and the cathode compartment; and a mobile ion carrier; wherein the NO and the redox active $N_xO_y$ is the active cathode ingredient, and the partition is conductive of the mobile ion carrier and nonconductive of a $N_xO_y^+$ ion.

The inventors have disclosed the equilibrium relationship of NO, $NO_2$ and $N_2O_4$ in copending U.S. application Ser. No. 14/221,814, filed Mar. 21, 2014. Accordingly, these materials are represented by the formula $N_xO_y$ where x is 1 or 2 and y is 1, 2 or 4.

In one aspect of the first embodiment, the partition is a membrane comprising at least one of a gel, a polymer, a ceramic material and a composite of a polymer and a ceramic material. In a further special aspect of this embodiment, the partition is a membrane comprising a ceramic material and the ceramic material is a dense ceramic membrane.

In one further specific aspect of the first embodiment, the metal of the anode comprises lithium, sodium or magnesium.

In a second embodiment the present invention includes a rechargeable battery comprising the electrochemical cell according to claim 1. In a specialized aspect of the second embodiment the present invention includes a $N_xO_y$ supply system which is attached to the battery and feeds $N_xO_y$ to the cathode.

In another embodiment, the present invention includes a vehicle having the rechargeable battery and the $N_xO_y$ supply system wherein the $N_xO_y$ supply system obtains $N_xO_y$ from the exhaust of the vehicle combustion engine.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

Figure 1:
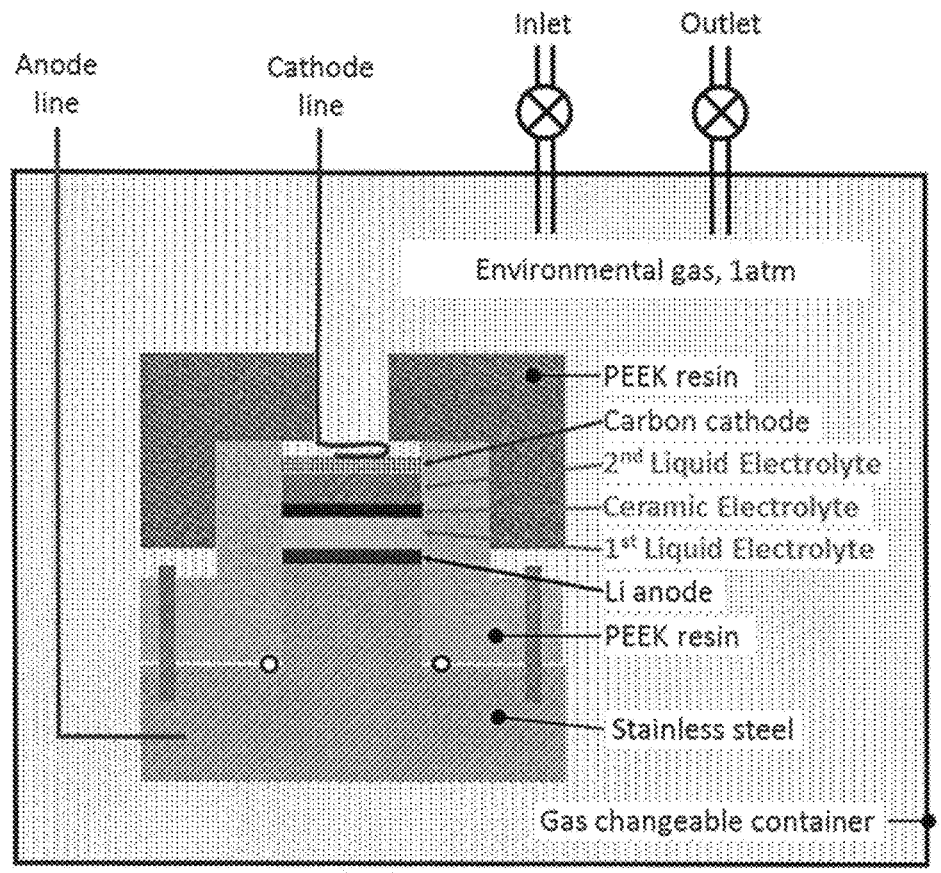
FIG. 1 shows a schematic diagram of a metal $N_xO_y$ battery according to one embodiment of the present invention.

The present inventors are conducting a wide scale study directed to materials and structure of a metal-gas battery having high capacity and high working potential. In the parent application described in the first paragraph above, a metal-NO electrochemical cell was disclosed. However, as described above, although the cell functioned as a battery, improvement of that performance was necessary in order to obtain a commercially viable battery and battery system. In a related copending application, the inventors disclose that not only pure nitric oxide may be useful as a cathodic active material, but also nitrogen oxides of the formula $N_xO_y$ as defined above. Moreover, these gases are functional even though mixed with other gases commonly found in the exhaust stream of a combustion engine.

Throughout this description all ranges described include all values and sub-ranges therein, unless otherwise specified. Additionally, the indefinite article "a" or "an" carries the meaning of "one or more" throughout the description, unless otherwise specified.

According to the present invention the term "vehicle" means any power driven device designed for transportation including an automobile, truck van, bus, golf cart and other utility forms of transportation.

In the course of ongoing study and evaluation of potential gas cathodic materials, the present inventors have surprisingly discovered that redox active gases of formula $N_xO_y$, wherein x is 1 or 2 and y is 1, 2 or 4 can function as a cathode gas for a metal-gas electrochemical cell. Previously disclosed work showed that $N_xO_y$ gas possesses higher working voltage as well as higher reversibility (rechargeability) than $O_2$ gas. Hereinafter, the formula $N_xO_y$ will be used to represent one or more of NO, $NO_2$, and $N_2O_4$.

However, in the model cell previously described, the discharge capacity was typically only about 33% of the charge capacity. The inventors believe that in the model cell, NO as the charged state may easily diffuse in the electrolyte media to the anode where it would be reduced back to NO even during charging. As a result of this migration and reduction, the concentration of charged species near the working electrode just after charging is significantly depleted and therefore, upon discharge the concentration of the NO quite low in comparison to the charge capacity, and thus the coulombic efficiency is also very low.

Therefore, the first embodiment of the present invention is an electrochemical cell comprising: an anode compartment comprising a working electrode which comprises a metal; a cathode compartment comprising a porous cathode supplied with a gas comprising $N_xO_y$; a partition located between and separating the anode compartment and the cathode compartment; and a mobile ion carrier; wherein the $N_xO_y$ is the active cathode ingredient, and the partition is conductive of the mobile ion carrier and nonconductive of a $N_xO_y^+$ ion.

The inventors have determined that by insertion of a partition which does not allow passage of a $N_xO_y^+$ specie between the anode and cathode, the charged species are maintained only near the cathode. The purpose of this partition is to hinder the diffusion of the charged species from cathode to anode, and ultimately to shut off the diffusion. The partition must allow passage of the mobile carrier in the overall battery system. Therefore, the structure of the partition must be varied to correspond with the ion conducting property depending on the mobile carrier. For example, in a Li electrochemical system, a partition which efficiently conducts Li ions is employed. Likewise, in a Mg electrochemical system, a magnesium ion conducting partition is employed. The partition may be in the form of a membrane which is constructed of polymer, ceramics or a composite thereof. To reduce any detrimental effect of gas on performance of the anode, an effective partition will be fully impermeable or substantially impermeable to gas, thus preventing gas admitted to the cathode compartment from entrance to the anode compartment. A preferable partition is a dense ceramic membrane. For example, the partition may be a lithium-ion conducting ceramics plate in the Li system, and more concretely, Li—La—Ti—O based perovskite, Li—Al—Ti—P—O based NASICON, Li—La—Zr—O based garnet, Li—P—S based solid electrolyte and Li—Ge—P—S based solid electrolyte are examples of the lithium-ion conducting ceramics.

The metal of the anode may comprise any of lithium, sodium, magnesium, aluminum, silver and copper. In preferred embodiments the metal may be lithium, sodium or magnesium.

The positive electrode may be of a porous unit construction comprising an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $N_xO_y$ redox reaction. The $N_xO_y$ absorbing catalyst may contain as its active component any material which promotes $N_xO_y$ absorption. Examples of a suitable catalyst active component include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. The rate of $N_xO_y$ absorption may be increased by the addition of a precious metal such as Pt, Pd, Rh, or any combination thereof. The positive electrode may contain an electrically-conductive material which is chemically stable in the potential window of use of the cell. Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the $N_xO_y$, it may be preferable that the collector is a porous body, such as mesh. In certain embodiments the charge collector may comprise a protective coating of an oxidation-resistant metal or alloy to protect the collector from oxidation.

In one specific embodiment of the present invention, the metal of the negative electrode comprises one selected from the group consisting of lithium, sodium, potassium, magnesium, calcium, aluminum and zinc and in a specific embodiment the metal of the negative electrode is one of lithium, sodium and magnesium.

Due to the presence of the partition the electrochemical cell is divided into an anode compartment and a cathode compartment. The electrolyte ion or mobile ion carrier is selected to be compatible with the metal of the electrode. Such materials are conventionally known to one of skill in the art. For example, when the anode comprises lithium, the electrolyte salt may comprise one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

Also in consideration that the cell contains two compartments, each compartment may optionally and independently contain a nonaqueous solvent system. Herein the system of the anode compartment may be referenced as the anolyte while the system of the cathode compartment may be referenced as the catholyte. Nonaqueous solvents suitable for either compartment include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methylethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. In some preferred embodiments the solvent may be a nitrile system solvent such as acetonitrile or an ionic liquid. Ionic liquids comprise any of cations such as imidazolium cation, piperidinium cation, pyrrolidinium cation and ammonium cation and any of anions such as bis(trifluoromethansulfonyl)imide anion, bis(fluorosulfonyl)imide anion, tetrafluoroborate anion and hexafluorophosphate anion. In one preferred embodiment the solvent is an ionic liquid such as N-methyl-N-propylpiperidinium bis(trifluoromethansulfonyl)imide (PP13TFSI) and N,N-Diethyl-N-Methyl-N-(2-methoxyethyl)ammonium bis(trefluoromethansulfonyl)imid (DEMETFSI).

An example of a lithium electrochemical cell according to the present invention is schematically shown in FIG. 1. In FIG. 1 the partition is labeled as ceramic electrolyte and the cathode compartment contains the $2^{nd}$ liquid electrolyte and the carbon cathode while the anode compartment contains the $1^{st}$ electrolyte and the lithium anode. The cell is housed in a container which is charged with a gas comprising the cathode active gas (NO or equilibrium oxides $NO_2$ and/or $N_2O_4$). The gas enters the cathode compartment through the opening of a poly(ether ether ketone) (PEEK) resin which contains the Cathode line.

The present invention further provides a rechargeable battery comprising the metal-$N_xO_y$ electrochemical cell.

As $N_xO_y$ gases are components of the exhaust of combustion engines, a system wherein the $N_xO_y$ is obtained from the exhaust gas of the combustion engine and fed to a metal-$N_xO_y$ battery may be constructed.

Figure 3:
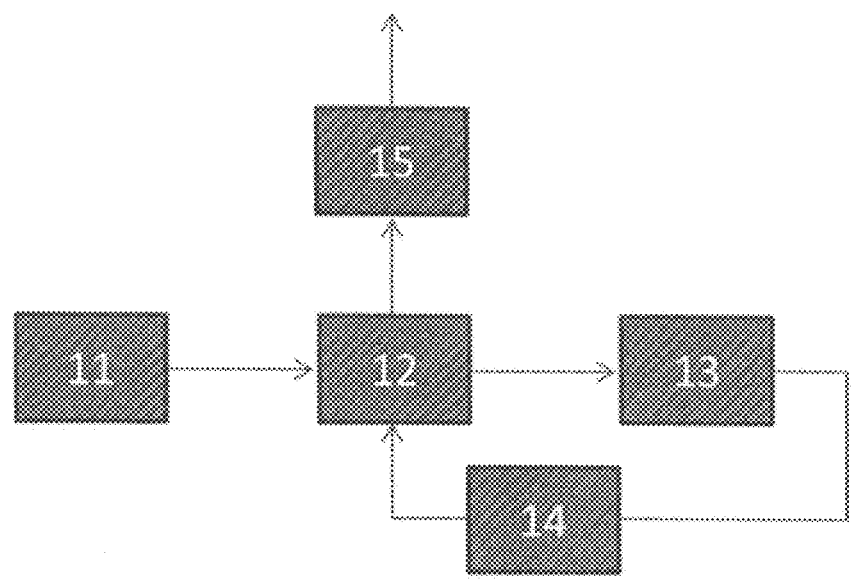
FIG. 3 shows a schematic diagram of a battery system for a vehicle according to an embodiment of the present invention.

Thus in a further embodiment, the present invention provides a rechargeable battery equipped with a $N_xO_y$ gas feed and in a special embodiment the gas feed is a component of a system wherein the $N_xO_y$ is obtained from the exhaust of a combustion engine. One example of such a system is schematically shown in FIG. 3 where the $N_xO_y$ gas is collected from the gas mainstream out of the combustion engine by using, for example, a gas absorber, or alternatively the exhaust may be directly passed to the battery without being absorbed. Next, the collected $N_xO_y$ gas is released from the absorber into a battery where electrical energy is produced. After cycling, the $N_xO_y$ gas used for the battery reaction may be released from the battery and then new $N_xO_y$ gas from the absorber introduced into the battery. Release from the battery may be accomplished by vacuum draw or other conventional methods. The released gas may be mixed with fresh exhaust and directed to a catalytic reactor for conventional treatment before vented to the environment. Of course, as indicated in FIG. 3, the normal flow of the engine exhaust may be conducted from 11 through 12 to 15. In other embodiments, the $N_xO_y$ fed to the metal-$N_xO_y$ battery may be enriched within the feed system. In order to protect the battery, the $N_xO_y$ feed may be cooled before entry into the battery. The feed of the $N_xO_y$ may be either continuous or of intermittent flow.

Having generally described this invention, a further understanding can be obtained by reference to certain specific examples which are provided herein for purposes of illustration only and are not intended to be limiting unless otherwise specified.

EXAMPLE

A lithium/$N_xO_y$ gas battery was constructed according to the structure schematically shown in FIG. 1. The $N_xO_y$ reaction gas supplied to the cathode was a mixture of NO/Ar/He (1%/1%/98%) gas which had been exposed to ambient air for 5 minutes prior to admission to the battery. The cathode was 2 sheets of Carbon paper (Toray, TGP-H-120) and the catholyte ($2^{nd}$ electrolyte) was N,N-Diethyl-N-Methyl-N-(2-methoxyethyl)ammonium bis(trifluoromethansulfonyl)imide (DEMETFSI, Kanto corporation) with 0.35 mol/kg LiTFSI (3M) and glass fiber was used as a separator (Whattman) and the ceramic partition (electrolyte) was a Li—Al—Ti—P—O based NASICON ceramic made by OHARA Inc. The anolyte was: 1M lithium bis(trifluoromethansulfonyl)imide LiTFSI (3M) in propylene carbonate (PC, Kishida Chemical).

Figure 2:
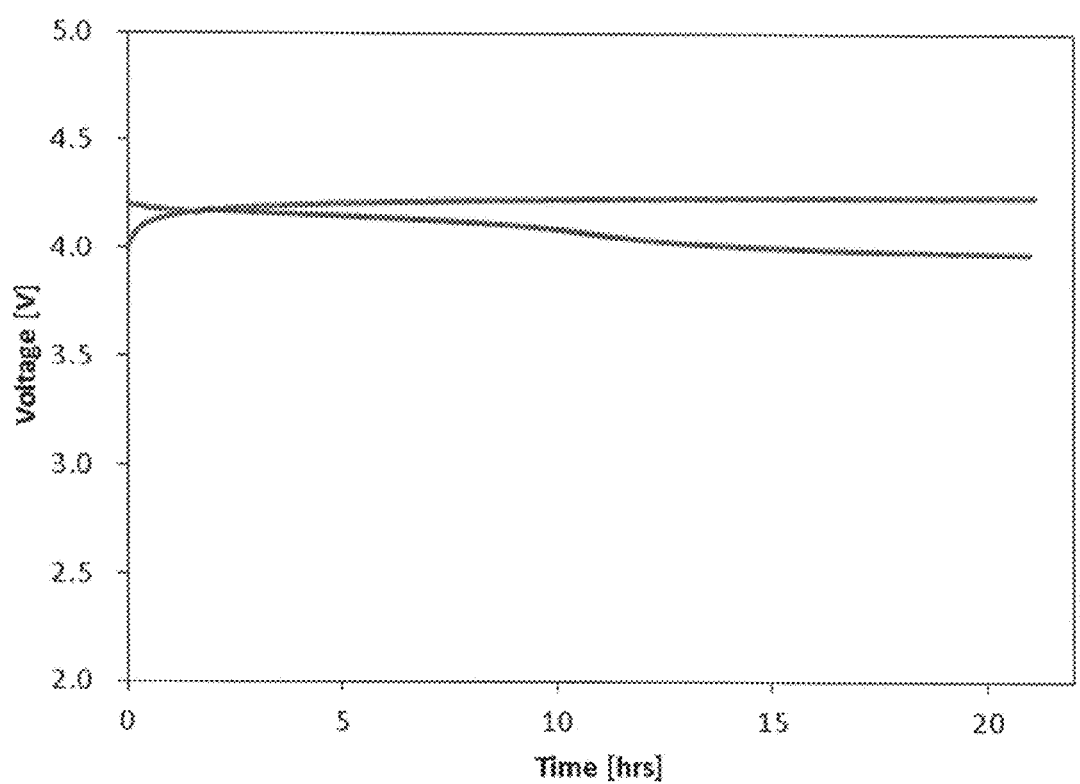
FIG. 2 shows the charge-discharge profiles of the metal $N_xO_y$ gas battery of the Example shown schematically in FIG. 1.

FIG. 2 shows the initial charge-discharge profiles of the Li/$N_yO_x$ gas battery shown schematically in FIG. 1 and described in the previous paragraph. By introducing a Li-ion conducting ceramic membrane as a partition between cathode and anode, as according to the present invention, the reversibility (coulombic efficiency) of the $N_xO_y$ redox reaction was almost 100% and highly reversible. The discharge voltage was maintained at higher voltage. As a result, the voltage hysteresis difference during charge and discharge was also narrow as indicated in FIG. 2.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A metal gas battery comprising:
   an anode compartment comprising a working electrode which comprises a metal as an active anodic ingredient;
   a cathode compartment comprising a porous cathode in contact with a gas comprising a redox active $N_xO_y$ gaseous compound;
   a partition located between and separating the anode compartment and the cathode compartment; and
   a mobile ion carrier;
   wherein
   x is 1 or 2 and y is 1, 2 or 4,
   the $N_xO_y$ is an active cathode ingredient,
   the partition is conductive of the mobile ion carrier and nonconductive of a $N_xO_y^+$ ion,
   the metal gas battery is nonaqueous, and
   the metal gas battery is rechargeable.

2. The metal gas battery according to claim 1, wherein the partition is a membrane comprising at least one of a gel, a polymer, a ceramic material and a composite of a polymer and a ceramic material.

3. The metal gas battery according to claim 1, wherein the partition is a ceramic membrane.

4. The metal gas battery according to claim 1 wherein the metal of the anode compartment working electrode comprises one metal selected from the group consisting of lithium, sodium, magnesium, aluminum, silver and copper.

5. The metal gas battery according to claim 4, wherein the metal of the anode compartment working electrode comprises magnesium.

6. The metal gas battery according to claim 4, wherein the metal comprises sodium.

7. The metal gas battery according to claim 1, wherein
the metal of the anode compartment working electrode comprises lithium,
the partition is a ceramic membrane, and
the ceramic membrane is a lithium ion conducting membrane comprising at least one ceramic selected from the group consisting of a Li—La—Ti—O perovskite, a Li—Al—Ti—P—O NASICON, a Li—La—Zr—O garnet, a Li—P—S solid electrolyte and a Li—Ge—P—S solid electrolyte.

8. The metal gas battery according to claim 7, wherein the oxidation reduction catalyst comprises at least one of an alkali metal oxide, alkaline earth metal oxide, an alkali metal carbonate and an alkaline earth metal carbonate.

9. The metal gas battery according to claim 1, further comprising a catholyte in the cathode compartment.

10. The metal gas battery according to claim 9, wherein the anode compartment further comprises an anolyte.

11. The metal gas battery according to claim 1, wherein the cathode comprises a porous charge collector and the porous charge collector is coated with a mixture of an oxidation reduction catalyst, a conductive material and a binder.

12. The metal gas battery according to claim 11, wherein the oxidation reduction catalyst is capable of absorption of $N_xO_y$.

13. The metal gas able battery according to claim 11, wherein the oxidation reduction catalyst is impregnated on at least one support selected from the group consisting of $Al_2O_3$, $ZrO_2$, $TiO_2$ and $CeO_2$.

14. The metal gas battery according to claim 11, wherein the battery comprises a gas inlet for introduction of a gas feed comprising the redox active $N_xO_y$ gaseous compound.

15. A vehicle comprising:
an internal combustion engine having an exhaust comprising a redox active $N_xO_y$ gaseous compound;
a metal gas battery according to claim 14; and
a $N_xO_y$ absorber attached to an exhaust system of the engine;
wherein the $N_xO_y$ absorber is in communication with the gas inlet of the battery and $N_xO_y$ from the exhaust is supplied to the battery through the gas inlet.

16. The vehicle according to claim 15, wherein the working electrode of the anode compartment comprises lithium.

17. The vehicle according to claim 15, wherein the partition of the metal gas battery is a ceramic membrane, and
the ceramic membrane is a lithium ion conducting membrane comprising at least one ceramic selected from the group consisting of a Li—La—Ti—O perovskite, a Li—Al—Ti—P—O NASICON, a Li—La—Zr—O garnet, a Li—P—S solid electrolyte and a Li—Ge—P—S solid electrolyte.

18. The vehicle according to claim 15, wherein the working electrode of the anode compartment comprises magnesium.

19. The vehicle according to claim 15, wherein the working electrode of the anode compartment comprises sodium.

20. The vehicle according to claim 15, wherein a $N_xO_y$ gas released from the metal gas battery is returned to the absorber.

21. A vehicle comprising:
an internal combustion engine having an exhaust comprising a redox active $N_xP_y$ gaseous compound;
a metal gas battery according to claim 14; and
a $N_xO_y$ feed source attached to an exhaust system of the engine;
wherein the $N_xO_y$ feed source is in direct communication with the gas inlet of the metal gas battery and exhaust comprising $N_xO_y$ is fed to the metal gas battery through the gas inlet.

22. The vehicle according to claim 21, wherein the working electrode of the anode compartment comprises lithium.

23. The vehicle according to claim 22, wherein the partition of the battery is a ceramic membrane, and
the ceramic membrane is a lithium ion conducting membrane comprising at least one ceramic selected from the group consisting of a Li—La—Ti—O perovskite, a Li—Al—Ti—P—O NASICON, a Li—La—Zr—O garnet, a Li—P—S solid electrolyte and a Li—Ge—P—S solid electrolyte.

24. The vehicle according to claim 21, wherein the working electrode of the anode compartment comprises magnesium.

25. The vehicle according to claim 21, wherein the working electrode of the anode compartment comprises sodium.

* * * * *